F. W. BURPEE.
WEIGHING MACHINE.
APPLICATION FILED APR. 27, 1914.

1,148,826.

Patented Aug. 3, 1915.
3 SHEETS—SHEET 2.

WITNESSES:
F. C. Matheny
O. Johnson

INVENTOR
Frank W. Burpee
BY
C. D. Haskins
ATTORNEY

UNITED STATES PATENT OFFICE.

FRANK W. BURPEE, OF BELLINGHAM, WASHINGTON.

WEIGHING-MACHINE.

1,148,826.  Specification of Letters Patent.  Patented Aug. 3, 1915.

Original application filed December 24, 1913, Serial No. 808,553. Divided and this application filed April 27, 1914. Serial No. 834,848.

*To all whom it may concern:*

Be it known that I, FRANK W. BURPEE, a citizen of the Dominion of Canada, residing at Bellingham, in the county of King and State of Washington, have invented a certain new and useful Improvement in Weighing-Machines, of which the following is a specification.

My invention relates to improvements in automatic weighing machines and the object of my improvements is to provide a weighing machine which shall be adapted for use with assorting mechanism automatically to select and separate from a plurality of packages of merchandise, as packages of butter, cans containing fish, oysters, vegetables, fruit and the like, such ones of such packages as may be of weights that are less than a desired predetermined amount, and which weighing machine shall be simple in its plan of construction and be rapid and accurate in its operation.

The mechanism for automatically distributing or selecting the weighed articles in accordance with their respective weights is not claimed herein but is claimed in a copending application for Letters Patent filed by me under date of December 24, 1913, Serial No. 808,553.

I attain this object by devices disclosed by my co-pending application, Serial No. 808,553, filed December 24, 1913, for Letters Patent for assorting machine of which the present application is a division, within which assorting machine the invention of my present application is embodied, and such devices are further illustrated in the accompanying drawings, in which—

Figure 1:
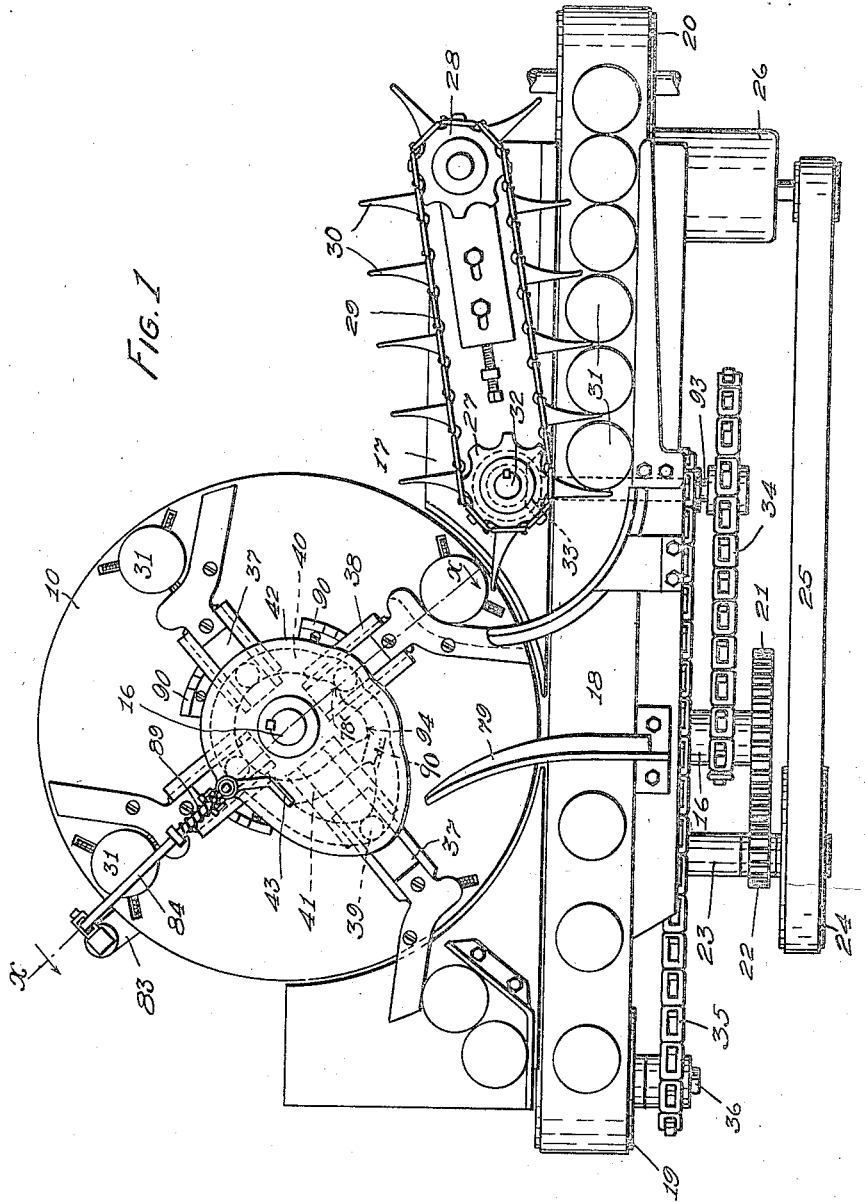
Figure 2:
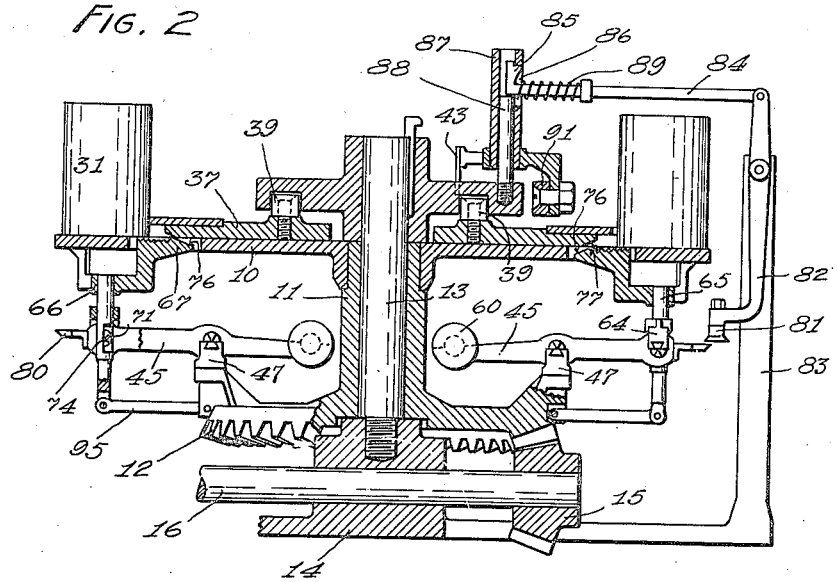
Figure 3:
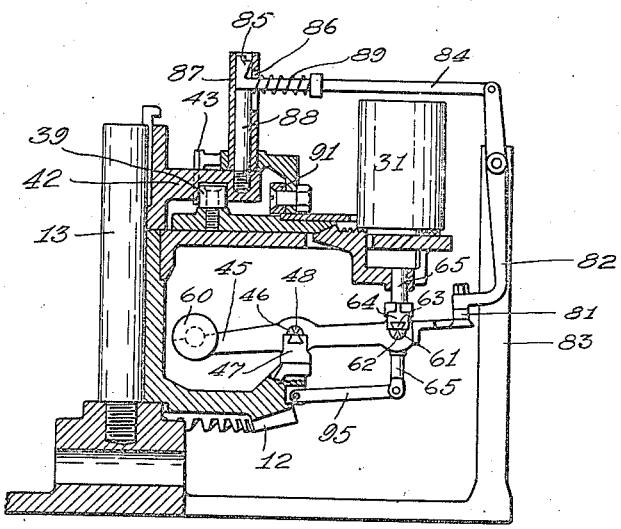
Figure 4:
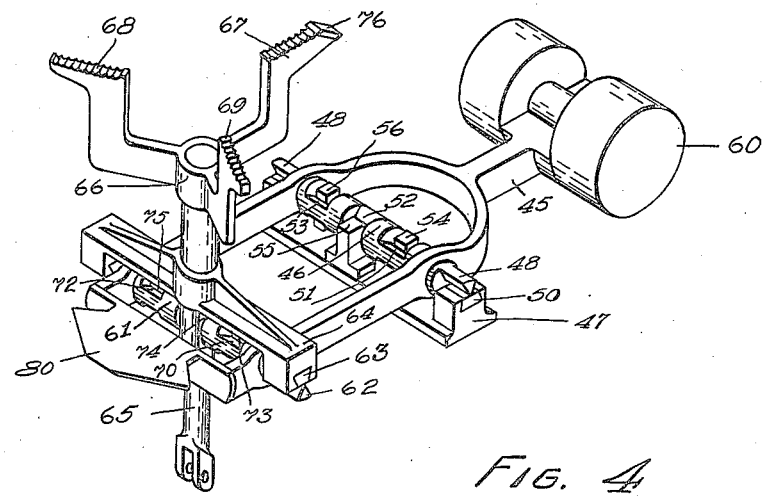
Figure 5:
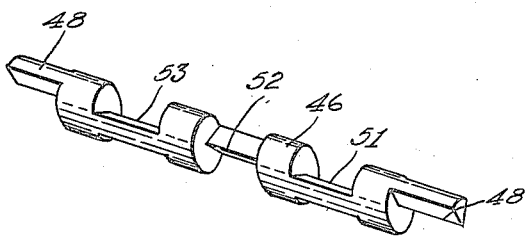
Figure 6:
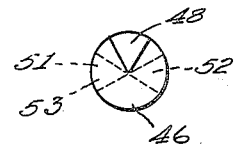

Figure 1 is a plan view of a weighing and assorting machine to which my scale is attached; Fig. 2 is a view in vertical section of the weighing table of such machine on broken line *x*, *x* of Fig. 1, showing certain portions of the scale in elevation; Fig. 3 is a similar view of a portion of the weighing table on same broken line *x*, *x* showing certain working parts in different position; Fig. 4 is a detached view in perspective of the scale mechanism; Fig. 5 is a view in perspective of a scale bearing shaft embodied in my invention; and Fig. 6 is a view in end elevation of the shaft illustrated in Fig. 5.

Referring to the accompanying drawings, in which like reference numerals indicate like parts, 10 is a circular table that is secured to a sleeve 11 which is formed integral with a bevel gear 12 and is adapted to rotate on a shaft 13 that is secured to a frame 14, the bevel gear 12 being adapted to mesh with a bevel pinion 15 that is provided on a driven shaft 16 whereby the table 10 may be caused to rotate.

A shelf 17, that is flush with the top surface of the table 10 and which is cut away (as shown in Fig. 1) to extend partly around the table 10, is provided with an endless belt 18 that is mounted on suitable pulleys 19 and 20 and is adapted to run in a groove in said shelf 17 to convey cans to and from such table.

The shaft 16 is provided with a large gearwheel 21 that meshes with a small gearwheel 22 that is provided on a shaft 23 which carries a belt pulley 24 and which is adapted to be driven by a belt 25 that is connected with any suitable source of power as a motor 26 whereby the shaft 16 may be rotated and by its movement may rotate the table 10.

The shelf 17 is provided with a driven sprocket gearwheel 27 and an idler gearwheel 28 upon which is disposed a movable link belt 29 that is provided at regular intervals with outwardly projecting fingers 30, 30 that are adapted to engage with cans 31, 31 or other packages of merchandise that are to be conveyed on the moving belt 18 toward the rotatable table 10 to deliver such cans 31, 31 one at a time to their proper positions on the rotating table 10, the gearwheel 27 being secured to a shaft 32 that extends downwardly through the shelf 17 and is connected by a bevel gear 33, illustrated by broken lines in Fig. 1, with a shaft 93 that is connected by a link belt 34 with the shaft 16 whereby the link belt 29 may be driven, the shaft 93 being connected by a link belt 35 with another shaft 36 upon which the belt pulley 19 is mounted whereby the movement of the belt 18 and the link belt 29 may have a fixed relation with each other.

The rotating table 10 is provided with a plurality of radially disposed can ejecting arms 37, 37 that are adapted to slide lengthwise in guides 38 on the table 10, such arms being provided on their inner ends with upwardly projecting rollers 39, that are adapted to roll in cam slots 40 and 41 which are provided in the lower surface of a plate 42 that is fixedly secured to the top end of the shaft 13 whereby the ejecting arms 37, 37 may be moved radially of the table 10, as more clearly explained in my said co-pending application, Serial No. 808,553, filed December 24, 1913.

The cam slot 40 is disposed to follow closely to the outer edge of the cam plate 42 and is of a somewhat irregular elliptical shape and the cam slot 41 extends across one end of such ellipse to connect together the two sides of the cam slot 40 thus uniting one portion of the cam slot 40 to form a slot of a somewhat irregular circular shape, the tendency of the rollers 39, 39 always being to follow the shorter cam slot 41 unless they are displaced by a gate 43 which is adapted to be lowered through a slot in the plate 42 to close the entrance to the cam slot 41 and cause the roller 39 to follow the outer slot 40, there being provided suitable mechanism for raising the gate 43 after the passage of each roller 39.

For the purpose of ascertaining the relative weights of the various articles of merchandise, delivered on to the table 10, with respect to a predetermined standard weight, I have provided a plurality of balancing scales that may be secured below the table 10 and there adapted to revolve with such table, and in order that the mechanism of such scales may not easily be displaced by the centrifugal force due to the rotation of such scales or by the contact of certain parts of such scales with other mechanisms associated with the table 10, with which they are adapted to engage, I have devised means to prevent the displacement of such parts without detracting from the sensitiveness of the balancing mechanism of such scales which means consists in the balancing lever 45 of each of such scales mounted on a fulcrum shaft 46 to adapt it to oscillate on a cross-bar 47 that is secured to the top side of the gearwheel 12 and adapted to move therewith.

The shaft 46, more clearly shown in Figs. 5 and 6, is disposed to extend crosswise of the bifurcated portion of the balancing lever 45, as shown in Fig. 4, and is provided at each end with knife edge bearings 48, 48 having downwardly directed apices that are adapted to rest upon agate bearing surfaces 50, 50 on each end of said cross-bar 49, and such shaft 46 is further provided at points between its ends with oppositely disposed knife edge bearings 51, 52 and 53 that are turned in a direction that is at a right angle to the direction of the knife edge bearings 48, 48 and are adapted to bear against bearing studs 54, 55 and 56 to prevent endwise displacement of the balancing lever 45 or displacement of such balancing lever due to a twisting movement, the knife edge 52 and the several knife edges 48, 48, 51, 52 and 53 all being formed to be exactly on the center line of the shaft 46, as more clearly illustrated in Fig. 6, whereby the balancing lever 45 may be perfectly free to oscillate up and down about the center of the shaft 46 as a fulcrum but may be prevented from moving in any other direction.

The balancing lever 45 is provided on its inner end with a weight 60 and on its outer end with a transverse bearing shaft 61 that is similar to the bearing shaft 46 and is provided at each end with upwardly directed knife edge bearings 62, 62 upon which are adapted to rest agate bearings 63, 63 that are provided on each end of a cross-bar 64, which cross-bar supports a medially disposed vertical shaft 65 to the upper end of which is secured a tripod 66 that is provided with engaging arms 67, 68 and 69 that project upwardly through suitable holes in the table 10 to engage with a can and lift it, and the lower end of which is articulated with the gearwheel 12 by a link 95, and such shaft 61 is further provided at points intermediate its length with oppositely disposed knife edge bearings 70, 71 and 72 that are adapted to bear against bearing surfaces 73, 74 and 75 to prevent twisting movement of the bar 64 or movement of such bar lengthwise of the balancing lever 45, as clearly shown in Fig. 4, the bearing surface 74 being preferably formed on the shaft 65 and the bearing surfaces 73 and 75 being formed on lugs that are provided on the bar 64.

The innermost tripod arm 67 is provided with a beveled end surface 76 one portion of which is adapted to project slightly above that portion of the tripod arm 67 that engages with the bottom of the can, such beveled portion 76 being adapted to be engaged by an oppositely disposed beveled surface 77 that is provided on the end of each of the can ejecting arms 37, as shown in Figs. 2 and 3, whereby when the can ejecting arms 37 are moved outwardly by the action of a sharply curved portion 78 in the cam slot 40 the arms 67, 68 and 69 of the scale tripod will be depressed to permit a can 31 or other article of merchandise to be moved on to the table 10 over such scale arms 67, 68 and 69 without touching or interfering with such scale arms, the ejecting arm 37 being withdrawn by the action of the cam slot 40 as soon as the can has been placed on the table 10 thus permitting the scale arms 67, 68 and 69 to engage with the bottom of the can to raise it to test its weight.

If the can be of such weight that the scale will not lift it above the surface of the plate 10, as illustrated in Fig. 2, then it will be carried around on the plate 10 to a point adjacent to the belt 18 and delivered back on to such belt 18 by the action of a deflecting guide 79 in conjunction with the action of the ejecting arm 37, the roller of which ejecting arm having followed the inner slot 41 is moved outwardly by the peculiar shape of such slot at a point 94.

If the can be sufficiently light in weight to permit the scale to lift it above the surface of the plate 10, as shown in Fig. 3, thus permitting the outer end of the scale arm 45 to be raised, then an angularly shaped engaging member 80 that is provided on the outer end of such scale arm 45 will be raised sufficiently to cause the engaging member 80 to strike its angular surface against the periphery of a roller 81 that is provided on the lower end of a lever arm 82 which is pivotally mounted on a bracket 83 provided on the frame 14, to move the bottom end of such lever arm 82 outwardly and the top end of such lever arm inwardly, such top end being connected with the outer end of a horizontal link 84 whose inner end is formed with an upwardly projecting catch 85 and adapted to project through a slot 86 that is formed in the side of a sleeve 87 and to rest upon the top end of a vertical post 88 upon which the sleeve 87 is disposed to slide, the post 88 being fixedly secured to the cam plate 42, and a helical compression spring 89 is provided on the link 84 and adapted to press against the post 88 to keep the link 84 always pushed outwardly.

The gate 43 is carried by the sleeve 87, as clearly shown in Figs. 2 and 3, and is adapted to be lowered by the dropping of such sleeve 87 in response to an inward movement of the link 84 occasioned by the raised engaging member striking the roller 81 to move the lower end of the lever arm 82 outwardly, such gate being adapted to be raised by lifting dogs 90, 90 that are provided on the plate 10 directly in front of each of the ejecting arms 37, 37 and which are adapted to engage with a roller 91 that is secured to the lower part of the sleeve 87 to lift such sleeve and the gate 43 when they are in a lowered position, as shown in Fig. 3.

If the can is of light weight it will cause the gate 43 to be lowered as hereinbefore described, thus causing the roller 39 on the ejecting arm 37 to follow the outer cam slot 40 to eject the can before it reaches the belt 18, as clearly shown in Fig. 1.

Owing to the rotary motion of the table 10 and the consequent exertion of centrifugal force that tends to displace the various parts of the scale and further owing to the contact of the engaging member 80 with the roller 81, and the jar and thrust occasioned thereby my scale is particularly adapted for use in connection with a machine of the class described but obviously it may be advantageously used in many other places and is not restricted to use with such a machine.

Manifestly many changes may be made in details embodied in my device without departing from the spirit of my invention or sacrificing any of its advantages.

What I claim is:

1. In a scale of the class described, the combination with a rotatable plate that is provided with a plurality of holes, of ejecting arms associated with said plate each of said ejecting arms being provided with an angular engaging surface, scales each embodying a balancing lever disposed beneath said table and secured thereto to rotate therewith, scale arms provided on one end of each of said balancing levers and adapted to extend upwardly through said holes in said plate to engage with an object whose weight is to be tested, means to actuate said ejecting arms to depress the scale arms below the level of the surface of said revolving plate, and means to place an object whose weight is to be tested on said revolving plate, said actuating means operating to retain the scale arms in lowered position during the operation of the last-named means.

2. In a machine of the class described, the combination with a supporting frame, of a rotatable table associated with said frame, said table being provided with holes that extend through it, a plurality of scale-levers pivotally mounted in fixed association with said table and disposed beneath said table, each of said scale levers being provided on one of its ends with arms that are adapted to project upwardly through said holes in said table to engage with objects to be weighed, and means for withdrawing said arms below the top surface of said table at predetermined points.

3. In a machine of the class described, the combination with a frame, of a circular table provided in said frame, means adapted to rotate said table, scales mounted below said table and adapted to move with said table to weigh articles that may be placed thereon, radially movable ejecting arms disposed on said table, upwardly projecting rollers provided on said ejecting-arms, and a plate provided with cam slots in which said roller may roll to move said ejecting arms.

4. In a machine of the class described, the combination with a frame, of a table mounted on said frame, means adapted to rotate said table, scales mounted beneath said table and adapted to revolve therewith, said scales being adapted to weigh articles that may be placed on said table, radially movable ejecting-arms slidably mounted on said table and provided with upwardly projecting rollers, and a fixedly secured plate having cam slots in which said rollers may move whereby said ejecting-arms may be moved radially of said table.

5. In a machine of the class described, the combination with a frame, of a table rotatably mounted on said frame, scales disposed below said table and adapted to move therewith, a belt to deliver articles to be weighed to said rotatable table, a spacer to place said articles on said table one at a time, and radially movable ejecting-arms slidably mounted on said table and adapted to discharge said articles from said table at suitable points.

6. In a machine of the class described, the combination with a frame, of a table rotatably mounted on said frame, a spacer adapted to place articles on said table one at a time, a plurality of scales associated with said table and adapted to weigh said articles, ejecting-arms slidably mounted on said table and provided with upwardly projecting rollers, a plate provided with cam slots to guide said rollers to move said ejecting-arms radially of said table, and a gate adapted to be actuated by suitable mechanism to close one of said cam slots to cause said rollers to follow another of said cam slots to impart a different radial movement to said ejecting-arms.

7. In a machine of the class described, the combination with a rotatable table, of scales disposed below said table and adapted to move therewith, a plurality of ejecting-arms slidably mounted on said table and provided with upwardly projecting rollers, and a fixedly secured plate provided with cam slots to receive said rollers whereby when said table is rotated said ejecting arms shall be moved radially of said table.

8. In a machine of the class described, the combination with a rotatable table having a plurality of scales secured thereto, of ejecting arms, a fixed plate having cam slots provided in the surface thereof, rollers on the said ejecting arms adapted to roll in said cam slots, and a gate adapted to be moved to close one of said cam slots to cause said rollers to follow another of said slots.

In witness whereof, I hereunto subscribe my name this 14th day of April A. D., 1914.

FRANK W. BURPEE.

Witnesses:
C. B. BURPEE,
R. UHLMANN.